United States Patent
Munthe

(10) Patent No.: US 12,212,028 B2
(45) Date of Patent: Jan. 28, 2025

(54) MANUFACTURING ARRANGEMENT FOR A FUEL CELL STACK AND METHOD FOR MANUFACTURING A FUEL CELL STACK

(71) Applicant: POWERCELL SWEDEN AB, Gothenburg (SE)

(72) Inventor: Stefan Munthe, Västra Frolunda (SE)

(73) Assignee: POWERCELL SWEDEN AB, Gothenburg (SE)

(*) Notice: Subject to any disclaimer, the term of this patent is extended or adjusted under 35 U.S.C. 154(b) by 0 days.

(21) Appl. No.: 17/251,243

(22) PCT Filed: Jun. 18, 2019

(86) PCT No.: PCT/SE2019/050574
§ 371 (c)(1),
(2) Date: Dec. 11, 2020

(87) PCT Pub. No.: WO2020/005137
PCT Pub. Date: Jan. 2, 2020

(65) Prior Publication Data
US 2021/0249680 A1    Aug. 12, 2021

(30) Foreign Application Priority Data
Jun. 26, 2018  (SE) ................................. 1850786-3

(51) Int. Cl.
*H01M 8/0247* (2016.01)
*H01M 8/0297* (2016.01)
(Continued)

(52) U.S. Cl.
CPC ....... *H01M 8/2404* (2016.02); *H01M 8/0247* (2013.01); *H01M 8/0297* (2013.01);
(Continued)

(58) Field of Classification Search
CPC ............. H01M 8/2404; H01M 8/0247; H01M 8/0297; H01M 8/1004
See application file for complete search history.

(56) References Cited

U.S. PATENT DOCUMENTS

| | | | |
|---|---|---|---|
| 6,423,439 B1 | 7/2002 | Barton et al. | |
| 7,005,209 B1 * | 2/2006 | Gaines ................ | H01M 8/2483 429/511 |

(Continued)

FOREIGN PATENT DOCUMENTS

| | | |
|---|---|---|
| CN | 102157747 A | 8/2011 |
| CN | 106025321 A | 10/2016 |

(Continued)

OTHER PUBLICATIONS

Indian Official Action (Sep. 10, 2021) for corresponding Indian App. 202027055814.

(Continued)

*Primary Examiner* — Olatunji A Godo
(74) *Attorney, Agent, or Firm* — WRB-IP PLLC

(57) ABSTRACT

A manufacturing arrangement for a fuel cell stack includes at least a first alignment station having a first alignment structure for receiving a bipolar plate and a second alignment structure for arranging a membrane electrode assembly at one side of the bipolar plate, preferably on top of the bipolar plate, in a predefined orientation for aligning the bipolar plate and the membrane electrode assembly, whereby a pre-assembled fuel cell unit is provided; a fastening station for fastening the membrane electrode assembly to the bipolar plate, whereby an assembled fuel cell unit is provided; and a second alignment station having at least one third alignment structure for aligning the assembled fuel cell units for providing a fuel cell stack, as well as a method for manufacturing a fuel cell stack, and a fuel cell stack (Continued)

having been manufactured by such an arrangement and/or method.

17 Claims, 2 Drawing Sheets

(51) Int. Cl.
*H01M 8/1004* (2016.01)
*H01M 8/2404* (2016.01)
*H01M 8/249* (2016.01)
*H01M 8/10* (2016.01)

(52) U.S. Cl.
CPC ......... *H01M 8/1004* (2013.01); *H01M 8/249* (2013.01); *H01M 2008/1095* (2013.01)

(56) References Cited

U.S. PATENT DOCUMENTS

| | | | |
|---|---|---|---|
| 2006/0046131 A1 | 3/2006 | Frank et al. | |
| 2006/0127732 A1 | 6/2006 | Yoshida et al. | |
| 2008/0289755 A1 | 11/2008 | Burdzy et al. | |
| 2009/0000732 A1* | 1/2009 | Jacobine | H01M 8/0271 156/331.7 |
| 2009/0197149 A1* | 8/2009 | Carlisle | H01M 8/2457 429/508 |
| 2011/0159396 A1 | 6/2011 | Kleeman et al. | |
| 2012/0039698 A1* | 2/2012 | Hoppes | H01M 10/0404 414/800 |
| 2012/0260498 A1 | 10/2012 | Rober et al. | |
| 2015/0132678 A1 | 5/2015 | Hood | |
| 2016/0365598 A1 | 12/2016 | Ju et al. | |
| 2016/0365599 A1* | 12/2016 | Ju | H01M 8/248 |
| 2019/0372134 A1* | 12/2019 | Katikaneni | H01M 8/1213 |

FOREIGN PATENT DOCUMENTS

| | | |
|---|---|---|
| CN | 106252698 A | 12/2016 |
| CN | 106876756 A | 6/2017 |
| DE | 10025207 A1 | 11/2001 |
| DE | 102016205043 A1 | 9/2017 |
| EP | 1021847 A1 | 7/2000 |
| JP | 2003022828 A | 1/2003 |
| JP | 2005190946 | 7/2005 |
| JP | 2005190946 A | 7/2005 |
| JP | 2007157387 A | 6/2007 |
| JP | 2011528159 A | 11/2011 |
| KR | 20090062963 A | 6/2009 |
| KR | 20090108477 A | 10/2009 |
| KR | 1020160144835 A | 12/2016 |

OTHER PUBLICATIONS

International Search Report (Sep. 23, 2019) for corresponding International App. PCT/SE2019/050574.
Swedish Search Report (Nov. 20, 2018) for corresponding Swedish App. 1850786-3.
ZBT. PRO INNO II—"Entwicklung eines Produktions- und Prufverfahrens zur Herstellung der Dichtungseinkeit bei graphitischen Brenstoffzellen". YouTube [online] [video]. Feb. 14, 2012 [retrieved on Nov. 4, 2020]. Retrieved from https://www.youtube.com/watch?v=KhrcHO_qw80; 0:20-1:01,1:45-2:04 and 2:06-2:50 into the video.
Japanese Official Action (Nov. 30, 2021) for corresponding Japanese App. 2020-565893.
Japanese Official Action (Jun. 9, 2022 for corresponding Japanese App. 2020-565893.
Chinese Official Action (Apr. 26, 2024) for correspondiong Chinese App. 201980042159.0.
Korean Official Action (Jan. 6, 2023) for corresponding Korean App. 10-2020-7034936.
Korean Official Action (Mar. 23, 2023) for corresponding Korean App. 10-2020-7034936.
Indian Official Action (Dec. 19, 2023) for corresponding Indian App. 202027055814.
Canadian Official Action (Oct. 13, 2022) for corresponding Canadian App. 3,099,303.
Chinese Official Action (Nov. 1, 2024) for correspondiong Chinese App. 201980042159.0.

* cited by examiner

MANUFACTURING ARRANGEMENT FOR A FUEL CELL STACK AND METHOD FOR MANUFACTURING A FUEL CELL STACK

BACKGROUND AND SUMMARY

The present invention relates to a manufacturing arrangement for a fuel cell stack as well as to a method for manufacturing a fuel cell stack and a fuel cell stack, which has been manufactured by means of said arrangement and/or method.

A fuel cell stack usually comprises two monopolar plates between which a plurality of membrane electrode assemblies is arranged, which in turn are separated by bipolar plates. The membrane electrode assembly (MEA) itself comprises at least a cathode, an anode and a membrane therebetween, for reacting hydrogen and oxygen, to electric energy and water. For providing the reactants (hydrogen and oxygen) to the respective electrodes, the bipolar plates arranged at both sides of the MEA have a fluid flow field which guides the reactants' fluid flow to the respective electrodes.

Since the reaction in a single MEA typically produces insufficient voltage for operating most applications, a plurality of the MEAs is stacked and electrically connected in series to achieve a desired voltage. Electrical current is collected from the fuel cell stack and used to drive a load.

The efficiency of the fuel cell stack depends on the flow of reactants across the surfaces of the MEA as well as the integrity of the various contacting and sealing interfaces within individual fuel cells of the fuel cell stack. Such contacting and sealing interfaces include those associated with the transport of fuels, coolants, and effluents within and between fuel cells of the stack. Consequently, proper positional alignment of fuel cell components and assemblies within a fuel cell stack is critical to ensure efficient operation of the fuel cell system.

For aligning and stacking, usually an alignment tool, as for example an alignment framework having at least one guiding element, is used, which ensures a predefined arrangement of the MEAs and bipolar plates during the stacking process. After the desired amount of MEAs and bipolar plates has been stacked, the resulting fuel cell stack is compressed, e.g. screwed together or otherwise bonded, so that the fuel cell stack can be used in the desired application.

For ensuring a proper alignment of the MEAs and the bipolar plates it has been proposed in the state of the art, to provide both MEA and bipolar plate with alignment features such as recesses into which the guiding elements of the alignment framework may be inserted or incorporated.

The disadvantage of the known alignment is that both MEA and bipolar plates have to be provided with the respective alignment features, which is very costly, and only very narrow tolerances in the manufacture of MEAs and bipolar plates are allowable. Additionally, the stacking process is very time consuming and in case only a single bipolar plate or MEA is not properly aligned, the complete stack has to be dismissed.

It is therefore desirable to provide a manufacturing arrangement and method for manufacturing a fuel cell stack, which allows for a fast, reliable and cost effective stacking of a fuel cell stack.

In the following a manufacturing arrangement for a fuel cell stack is proposed which comprises at least a first alignment station having a first alignment structure for receiving a bipolar plate and a second alignment structure for arranging a membrane electrode assembly (MEA) on one side of the bipolar plate, preferably on top of the bipolar plate, in a predefined orientation. Thereby, the bipolar plate and the membrane electrode assembly are aligned and a so-called pre-assembled fuel cell unit is provided.

Thereby it should be noted that the indication of "first" and "second" alignment structure does not necessarily relate to the order in which the fuel cell components are handled. Hence, it is also possible that the MEA is firstly place into the second aligning structure and only in a subsequent step, the bipolar plate is place on top of the MEA.

The arrangement further comprises a fastening station for fastening the membrane electrode assembly to the bipolar plate, whereby an assembled fuel cell unit is provided. This ensures that the spatial orientation of the components of the pre-assembled unit fuel cell is preserved. It should be noted that at the fasting station only the spatial orientation of the bipolar plate and the MEA needs to be ensured. The fluid-tightness of MEA and bipolar plate is usually achieved by compressing the completely stacked fuel cell stack.

The arrangement further comprises a second alignment station having at least one third alignment structure for aligning the assembled fuel cell units for providing a fuel cell stack.

Advantageously, by providing a manufacturing arrangement having at least two separate alignment stations, the stacking process can be accelerated and automated. This is due to the fact that for stacking the fuel cell stack as such (second alignment), already assembled fuel cell units with already aligned and fixated bipolar plates and MEAs may be used. Additionally, since the MEA is only arranged on one side of the bipolar plate the stacking procedure is facilitated.

Particularly when stacking the fuel cell units to the fuel cell stack in the second manufacturing station, the fuel cell unit may be grabbed by the bipolar plate, e.g. by vacuum grabbing and may then be placed upside down i.e. having the bipolar plate on top of the MEA, into the third alignment structure. During this, the MEA is hold in its preassembled spatial orientation by the fixation provided in the fastening station so that, in the third alignments structure, the alignments of the fuel cell units may be based on the spatial orientations of the MEAs, only.

When stacking the fuel cell units it is of importance to have the bipolar plate on top of the MEA. This lowers the risk of tearing the MEA loose from the bipolar plate and it also lowers the risk of having a bended MEA when stacking. Bending of the MEA is always a risk, particularly when stacking the un-assembled components, as the MEA is much more flexible than the rigid bipolar plate. A bended MEA during the stacking procedure in turn results in a less good aligned fuel cell stack and a deterioration in performance.

A further advantage is that, even if the MEA is only placed on one side of the bipolar plate, the rigidity of the bipolar plate enforces the rigidity of the MEA to such an extent, that the MEA alone may be used as basis for the alignment of the fuel cell units. The bipolar plate itself may be completely disregarded for the alignment of the fuel cell stack. In the state of the art a unit fuel cell usually comprises a MEA with is sandwiched by two flow field plates. This always results in the undesired but necessary contact of the flow field plates for the alignments during stacking procedure.

The proposed manufacturing arrangement has the further advantage that, even softer materials may be used for the MEA and/or the MEA may be made thinner which allows for use of materials providing a higher electricity yield and/or the stacking of more fuel cell units into a stack having the same dimensions as the known fuel cell stacks. This is due to the fact that the MEA is stabilized by the bipolar plate, which in turn is fastened to the MEA for keeping the proper alignment.

According to a further preferred embodiment, the manufacturing arrangement further comprising at least a first handling device for transferring the pre-assembled fuel cell unit to the fastening station, wherein preferably the first handling device is a movable element, particularly a rotating table, which comprises the first and second structure for aligning the bipolar plate and the membrane electrode assembly. Alternatively, the movable element may be a moveable alignment structure, e.g. a fixture, which firmly holds the bipolar plates and/or the MEA.

By using a handling device, the first alignment station and the fastening station do not necessarily need to be arranged at the same location. This allows for an accelerated stacking procedure, as the alignment station is already free for operation even if the bipolar plate and MEA are not yet fastened to provide the assembled fuel cell unit.

Thereby it is preferred, if the pre-assembled fuel cell unit is not handled in such a way that its predefined spatial orientation is likely to get lost. This can be ensured for example by means of a moveable element or a rotating table which moves/rotates the preassembled fuel cell unit to the fastening station without endangering the spatial orientation of MEA and bipolar plate.

Instead of moving the per-assembled fuel cell unit from the alignment station to the fasting station it is also possible to combine the first alignment station and the fastening station to a fuel cell unit assembling station, at which the bipolar plate and the MEA are first aligned and then fastened. For that the combined fuel cell assembling station may comprise an aligning manipulator for aligning the bipolar plate and the MEA and a fastening manipulator, particularly a welding manipulator, for fastening the membrane electrode assembly to the bipolar plate. Instead of a welding manipulator, any other fastening operation may be used, e.g. the bipolar plate may also be glued, heat combined by thermoplastics or soldered to the MEA.

The combined assembling station provides an even higher reliability for keeping the predefined orientation between bipolar plate and MEA.

According to a further embodiment, the fastening station and/or the combined assembling station comprises an ultrasonic welding manipulator. Instead of using an ultrasonic-welding manipulator, any other fastening manipulator/operation may be used, e.g. the bipolar plate may also be glued, heat combined by thermoplastics or soldered to the MEA.

It is further preferred if the manufacturing arrangement further comprises a second handling device for transferring the assembled fuel cell unit to the second alignment station, wherein preferably the second handling device is adapted to contact the assembled fuel cell unit at the membrane electrode assembly, only.

By providing the second handling device, the fastening station or the combined assembling station, respectively, and the second alignment station do not necessarily need to be arranged at the same location. This allows for an accelerated stacking procedure, as the first alignment station/fastening station or combined assembling station is already free for operation even if the fuel cell stacking is not yet fully completed. Additionally, the separate alignment stations can be precisely adapted to the respective alignment requirements. Hence the first and second alignment structures may be optimized for aligning bipolar plate and MEA, wherein the third alignment structure may be optimized for aligning the assembled fuel cell units, particularly the MEAs of the assembled fuel cell units, as contacting the bipolar plate is undesired.

According to another preferred embodiment, the membrane electrode assembly may extend over the bipolar plate in at least one region. This ensures that the bipolar plates are electrically separated from each other which in turn allows for avoiding any short circuit in the fuel cell stack. In case the MEA overlaps the bipolar plate, a correct alignment of bipolar plate and MEA had been very challenging. In the state of the art, there have been special alignment features such as recesses in the bipolar plate and openings in the MEA which should enable a correct alignment of bipolar plates and MEA. However, provision and use of these alignment features are time and cost consuming. Additionally, for a correct alignment of MEA and bipolar plate, it is necessary that at least in the area of the alignment features, MEA and bipolar plate are flush to each other for ensuring that both MEA and bipolar plate can be aligned, which in turn increases the risk of short circuit.

By using the two alignment stations of the manufacturing arrangement, it is even possible to allow the MEA to overlap the bipolar plate everywhere. Since the alignment of bipolar plate and MEA is secured by the fastening of MEA and bipolar plate in the predefined spatial orientation, it is possible to disregard the arrangement of the bipolar plate in the second alignment step/station completely, and to align the fuel cell units solely in relation to the MEA. For that, preferably, the protruding periphery of the membrane electrode assembly is used for the alignment and the at least one third alignment structure of the second alignment station is adapted to align the fuel cell units by aligning the protruding peripheries of the membrane electrode assemblies in said at least one region.

Another aspect of the present invention relates to a method for manufacturing a fuel cell stack comprising at least the steps of providing a pre-assembled fuel cell unit by arranging a membrane electrode assembly on one side of the bipolar plate, preferably on top of the bipolar plate, in a predefined spatial orientation, preferably by using a first alignment station having a first structure for receiving a bipolar plate and a second structure for arranging a membrane electrode assembly on one side of the bipolar plate;

providing an assembled fuel cell unit by fastening the membrane electrode assembly to the bipolar plate; and providing a fuel cell stack by aligning the assembled fuel cell units, preferably in a second alignment station having at least one third alignment structure.

The features and advantages described above in relation with the device also apply for the presented method.

Consequently, the method may further comprise the step of ultra-sonic welding the membrane electrode assembly to the bipolar plate.

According to a further preferred embodiment, the method comprises the step of aligning the assembled fuel cell units in the second alignment station by solely contacting the membrane electrode assembly of the assembled fuel cell unit.

Advantageously, the method further comprises the step of providing a membrane electrode assembly which extends over the bipolar plate in at least one region, arranging the electrode membrane assembly at the bipolar plate so that the periphery of the membrane electrode assembly protrudes over the bipolar plate in said at least one region, and aligning the fuel cell units by aligning the protruding peripheries of the membrane electrode assemblies in said at least one region.

According to another aspect, the present invention relates to a fuel cell stack comprising a plurality of fuel cell units comprising each a membrane electrode assembly which has been fastened to a bipolar plate, preferably by ultra-sonic welding, wherein the fuel cell stack has been manufactured by means of an arrangement as discussed above and/or by means of a method as discussed above.

According to a further embodiment, the fuel cell stack further comprises at least one fuel cell unit in which the MEA extends over the bipolar plate in at least one region.

Further advantages and preferred embodiments are disclosed in the claims, the description and the figures. It should be further noted that a person skilled in the art may regard or use the presented features individually or combine the presented features otherwise than indicated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims. The figures show:

DETAILED DESCRIPTION

Figure 1:
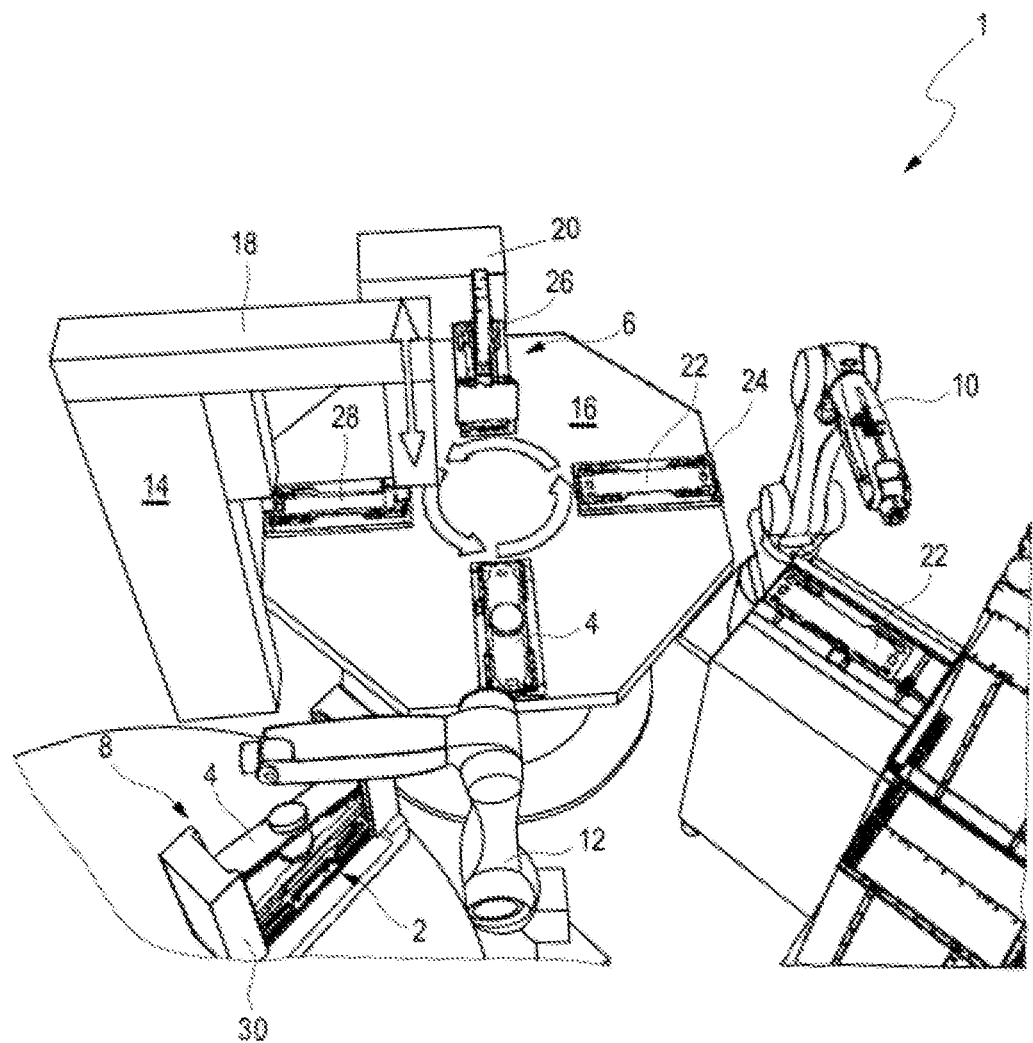
FIG. 1: a schematic perspective view of a first embodiment of a manufacturing arrangement for a fuel cell stack.

In the following same or similar functioning elements are indicated with the same reference numerals.

FIG. 1 shows a perspective view of a manufacturing arrangement 1 for manufacturing a fuel cell stack 2 by stacking a plurality of assembled fuel cell units 4. As illustrated, the manufacturing arrangement comprises a first alignment station 6 and a second alignment station 8. In the illustrated embodiment, there are two manipulating devices 10 and 12, which are adapted to handle the fuel cell elements. The manufacturing arrangement 1 further comprises a fastening station 14 and a handling device 16 for transferring the fuel cell elements from the alignment station 6 to the fastening station 14. The handling device 16 of the embodiment shown in FIG. 1 is a rotatable table.

As is further depicted in FIG. 1, the fastening station 14 comprises a welding manipulator 18, which is adapted to fasten or weld a membrane electrode assembly 26 to a bipolar plate 22. Further, the manufacturing arrangement 1 comprise an aligning manipulator 20 for aligning the membrane electrode assembly 26 to the bipolar plate 22.

In the following the operation of the manufacturing arrangement 1 will be described. In a first step, the handling manipulator 10 transfers a bipolar plate 22 to a first alignment structure 24, e.g. a fixture, which is arranged on the rotating table 16. Then the table 16 is rotated so that the bipolar plate 22 which is arranged in the alignment structure 24 is transported to the first alignment station 6, where the aligning manipulator 20 places a membrane electrode assembly (MEA) 26 on one side of the bipolar plate 22, i.e. in the illustrated embodiment of FIG. 1 on top of the bipolar plate 22. However, it is also possible that the MEA is placed underneath the bipolar plate and/or the first alignment structure is arranged subsequently to the second alignment structure.

The aligning of the MEA 26 on one side of the bipolar plate 22 may be performed by any suitable alignment method, regardless whether the MEA or the bipolar plate are handled first. For example, it is possible that the aligning manipulator 20 comprises a camera, which serves as second aligning structure and determines the position of the bipolar plate 22, and based on the determined position, the manipulator orientates/places the MEA 26 on the bipolar plate. Alternatively or additionally, it is also possible that there is a mechanical second alignment structure, which provides a predetermined spatial orientation for the MEA 26 in relation to the bipolar plate 22, when the MEA 26 is placed on top of the bipolar plate 22. Of course, any other alignment procedure is also possible.

After the MEA 26 is placed on top of the bipolar plate 22, a so-called pre-assembly fuel cell unit 28 is provided, which is transferred to the fastening station 14 by means of the rotating table 16. At the fastening station 14, the MEA 26 is fastened to the bipolar plate 22. This fastening may be done by ultrasonic welding, but any other suitable fastening method may be used, such as gluing, heat combining of thermoplastics, soldering etc. However, ultrasonic welding provides a fast and cheap fastening method, for which no added or special material is needed.

After the fastening station 14, the spatial orientation of the MEA 26 to the bipolar plate 22 is fixed, so that the now assembled fuel cell unit 4, may be removed from the first aligning station for further processing.

In the illustrated embodiment, the assembled fuel cell unit 4 is removed from the rotating table 16 by means of the second handling manipulator 12 and transported to the second alignment station 8 (stacking). It should be noted that, it is not necessary that the second alignment station 8 is arranged in close proximity to the first alignment station 6. Since the spatial orientation of MEA 26 and bipolar plate 22 is fixed due to the fastening step, the assembled fuel cell unit 4 may be transported to a remote location for the stacking process. It is also possible to put the assembled fuel cell units 4 on stock and perform the stacking process later on.

However, in the depicted embodiment of FIG. 1, the second alignment station 8 is arranged in close proximity to the first alignment station so that the assembled fuel cell units 4 may be transferred directly to the third alignment structure 30, which is adapted to align the fuel cell units 4 to provide the fuel cell stack 2. Thereby, the third alignment structure 30 may be adapted to align the periphery of the fuel cell units 4, only, which allows for a fast but precise arrangement of the fuel cell units 4. This is due to the fact that the spatial orientation of bipolar plate 22 and MEA 26 is fixed by fasting the MEA 26 to the bipolar plate 22.

Consequently, this allows for a fuel cell unit design in which the MEA 26 overlaps the bipolar plate 22 in at least one region 34 (see FIG. 2), wherein this region 34 is used for aligning the fuel cell units 4. This also ensures, that any contact of the third alignment structure with the bipolar plate may be avoided. Further, it is possible to provide a fuel cell unit design, in which the MEA 26 overlaps the bipolar plate 22 everywhere. In this embodiment, the third alignment structure 30 is adapted to align the fuel cell units 4 solely based on the periphery of the MEA 26. Thereby, a fuel cell stack 2 may be provided in which the risk of a short circuit resulting from contacting adjacent bipolar plates 22 may be avoided as the membrane of the MEA 26 reliably isolates the adjacent bipolar plates 22.

Figure 2:
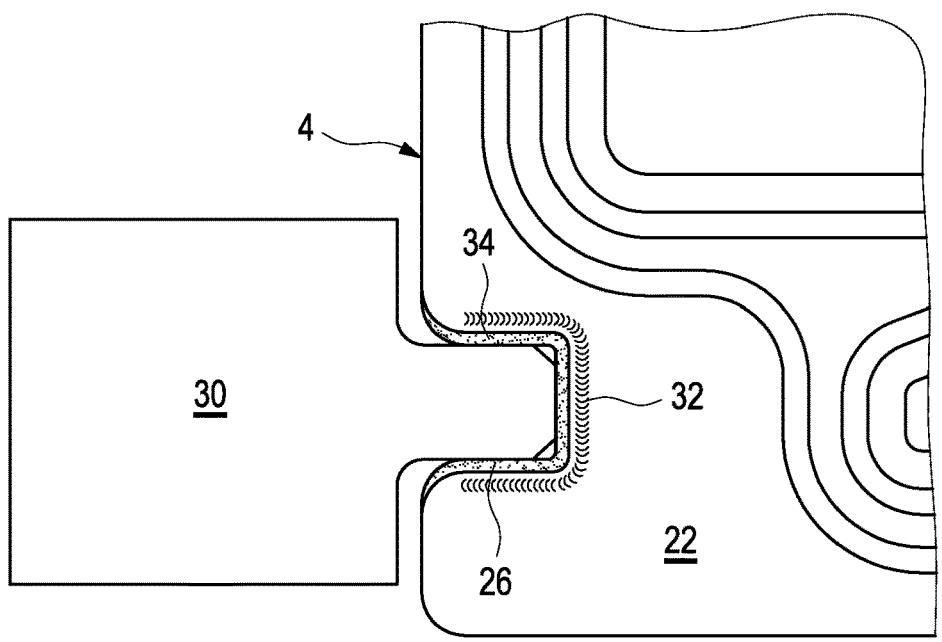
FIG. 2: a schematic view of a detail of an assembled fuel cell unit.

FIG. 2 depicts, in a detailed view, the assembled fuel cell unit 4 having a bipolar plate 22 and a MEA 26, which are fastened together by an ultrasonic weld seam 32. It can be further seen that the MEA 26 overlaps the bipolar plate 22 in at least the region 34, so that only the MEA 26 contacts the third alignment structure 30.

It is further advantageous that the bipolar plate 22 remains untouched by any device during the alignment of the fuel cell units of the fuel cell stack, which allows for a quick but precise alignment of the fuel cell units.

Figure 3:
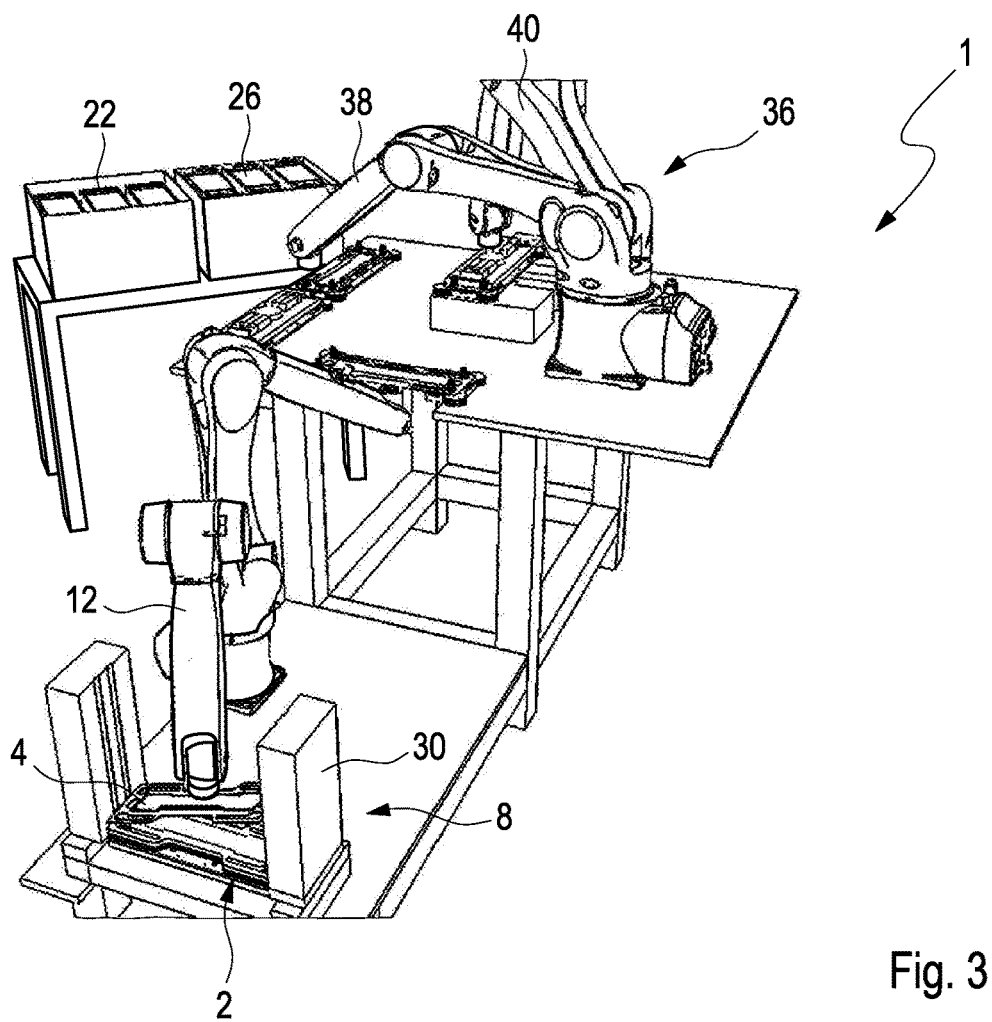
FIG. 3: a schematic perspective view of a second embodiment of a manufacturing arrangement.

FIG. 3 illustrates a further embodiment of the manufacturing arrangement 1. As can be seen, in the alternative embodiment aligning and fastening are performed at a combined assembling station 36, where two manipulator arms 38 and 40 are handling, aligning and fastening the bipolar plates 22 and the MEA 26 for providing the assembled fuel cell unit 4. In contrast to the manufacturing arrangement of FIG. 1, there is no rotating table, so the risk of misaligning the bipolar plate 22 and MEA 26 due to the rotating movement of the table is reduced.

After the fastening, the assembled fuel cell unit 4 is transferred to the second alignment station 8 comprising the alignment structure 30 for stacking the fuel cell units 4 to the fuel cell stack 2.

By separating the alignment of the individual fuel cell elements and the stacking of the fuel cell units into at least two different steps or stations, the alignment and stacking process may be accelerated and automated. Further, by fastening the MEA to the bipolar plate at the fastening station and in the fastening step, respectively, the spatial orientation of the fuel cell elements may be preserved. This in turn allows for a fuel cell unit design in which the MEA overlaps the bipolar plate, and allows equally for a fast and precise stacking process, as the stacking (or second aligning) may be performed based on the orientation of the MEA only. The spatial orientation of the bipolar plate itself can thus be disregarded, as it is already defined by the orientation of the MEA. It is further advantageous that by placing the MEA on one side of the bipolar plate and handling in the further steps the MEA only, the bipolar plate does not need to be contacted in the further assembling process, which ensures a quick and precise stacking procedure.

REFERENCE NUMERALS 1 manufacturing arrangement
2 fuel cell stack
4 fuel cell unit
6 first alignment station
8 second alignment station
10, 12 handling device
14 fasting station
16 rotating table
18 fasting manipulator
20 aligning manipulator
22 bipolar plate
24 first alignment structure
26 membrane electrode assembly (MEA)
28 preassembled fuel cell unit
30 third alignment structure
32 weld seam
34 region where MEA extends over bipolar plate
36 combined assembling station
38, 40 manipulator arms

The invention claimed is:

1. Manufacturing arrangement for a fuel cell stack comprising at least
    a first alignment station having a first alignment structure arranged for receiving a bipolar plate and a second alignment structure arranged for arranging a membrane electrode assembly at one side of the bipolar plate, in a predefined orientation for aligning the bipolar plate and the membrane electrode assembly, whereby a pre-assembled fuel cell unit is provided;
    a fastening station for joining the membrane electrode assembly to the bipolar plate using a joining element such that spatial orientation of the membrane electrode assembly and the bipolar plate is preserved in the pre-assembled fuel cell unit, whereby an assembled fuel cell unit is provided;
    a second alignment station having at least one third alignment structure for aligning a plurality of assembled fuel cell units for providing a fuel cell stack; and
    a rotating table for transferring the pre-assembled fuel cell unit from the first alignment station to the fastening station, the first alignment structure and the second alignment structure being disposed on the rotating table.

2. Manufacturing arrangement according to claim 1, wherein the first alignment station and the fastening station are combined in a fuel cell unit assembling station, comprising an aligning manipulator for aligning the bipolar plate and the membrane electrode assembly and a fastening manipulator for joining the membrane electrode assembly to the bipolar plate.

3. Manufacturing arrangement according to claim 1, wherein the fastening station comprises the joining element, the joining element comprising an ultra-sonic welding manipulator.

4. Manufacturing arrangement according to claim 1, further comprising a second handling device for transferring the assembled fuel cell unit to the second alignment station.

5. Manufacturing arrangement according to claim 1, wherein the membrane electrode assembly extends over the bipolar plate in at least one region, thereby providing a protruding membrane electrode assembly periphery, and wherein the at least one third alignment structure of the second alignment station is adapted to align the fuel cell units by aligning the protruding peripheries of the membrane electrode assemblies in the at least one region.

6. Method for manufacturing a fuel cell stack comprising at least the steps of
    providing a pre-assembled fuel cell unit at a first alignment station by arranging a membrane electrode assembly at one side of the bipolar plate;
    after providing the pre-assembled fuel cell unit, transferring the pre-assembled fuel cell unit to a fastening station via a rotating table;
    providing, at the fastening station, an assembled fuel cell unit by joining the membrane electrode assembly to the bipolar plate using a joining element such that spatial orientation of the membrane electrode assembly and the bipolar plate is preserved; and
    after providing the assembled fuel cell unit, providing a fuel cell stack at a second alignment station by aligning a plurality of assembled fuel cell units.

7. Method according to claim 6, further comprising the step of joining the membrane electrode assembly to the bipolar plate using the joining element, the joining element comprising an ultra-sonic welding manipulator.

8. Method according to claim 6, further comprising the step of aligning the assembled fuel cell unit in the second alignment station by solely contacting the assembled fuel cell unit at the membrane electrode assembly.

9. Method according to claim 6, further comprising the step of providing a membrane electrode assembly which extends over the bipolar plate in at least one region, arranging the membrane electrode assembly at the bipolar plate so that the periphery of the membrane electrode assembly protrudes over the bipolar plate in the at least one region, and aligning the fuel cell units by aligning the protruding peripheries of the membrane electrode assemblies in the at least one region.

10. Fuel cell stack comprising a plurality of assembled fuel cell units comprising each a membrane electrode assembly which has been joined to a bipolar plate, wherein the fuel cell stack has been manufactured by the method according to claim 6.

11. Fuel cell stack according to claim 10, wherein the at least one assembled fuel cell unit comprises a membrane electrode assembly, which extends over the bipolar plate in at least one region, thereby providing a protruding membrane electrode assembly periphery.

12. Manufacturing arrangement according to claim 1, wherein the second alignment structure is arranged for arranging the membrane electrode assembly on top of the bipolar plate.

13. Manufacturing arrangement according to claim 4, wherein the second handling device is adapted to contact the assembled fuel cell unit at the membrane electrode assembly.

14. Method according to claim 6, wherein the step of providing the pre-assembled fuel cell unit by arranging the membrane electrode assembly at the one side of the bipolar plate comprises arranging the membrane electrode assembly on top of the bipolar plate.

15. Method according to claim 6, wherein the step of providing the pre-assembled fuel cell unit by arranging the membrane electrode assembly at the one side of the bipolar plate comprises arranging the membrane electrode assembly at the one of the bipolar plate in a predefined orientation.

16. Method according to claim 6, wherein the step of providing the pre-assembled fuel cell unit by arranging the membrane electrode assembly at the one side of the bipolar plate comprises arranging the membrane electrode assembly at the one side of the bipolar plate using a first alignment station having a first structure for receiving a bipolar plate and a second structure for arranging a membrane electrode assembly on one side of the bipolar plate.

17. Method according to claim 6, wherein the step of providing the fuel cell stack by aligning the assembled fuel cell units is performed in a second alignment station having at least one third alignment structure.

\* \* \* \* \*